United States Patent
Jeong et al.

(10) Patent No.: US 9,621,450 B2
(45) Date of Patent: Apr. 11, 2017

(54) METHOD AND DEVICE FOR CONTROLLING SESSION KEEP-ALIVE FOR APPLICATION IN MOBILE COMMUNICATION SYSTEM

(71) Applicant: Samsung Electronics Co., Ltd., Gyeonggi-do (KR)

(72) Inventors: Sang-Soo Jeong, Gyeonggi-do (KR); Song-Yean Cho, Seoul (KR); Young-Kyo Baek, Seoul (KR); Han-Na Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 39 days.

(21) Appl. No.: 14/430,522

(22) PCT Filed: Sep. 16, 2013

(86) PCT No.: PCT/KR2013/008359
§ 371 (c)(1),
(2) Date: Mar. 23, 2015

(87) PCT Pub. No.: WO2014/046437
PCT Pub. Date: Mar. 27, 2014

(65) Prior Publication Data
US 2015/0256440 A1 Sep. 10, 2015

(30) Foreign Application Priority Data
Sep. 21, 2012 (KR) .......................... 10-2012-0105465

(51) Int. Cl.
*H04L 12/751* (2013.01)
*H04W 88/02* (2009.01)
(Continued)

(52) U.S. Cl.
CPC .......... *H04L 45/026* (2013.01); *H04L 67/141* (2013.01); *H04W 80/10* (2013.01); *H04W 88/02* (2013.01)

(58) Field of Classification Search
CPC .... H04L 67/141; H04L 45/026; H04W 80/10; H04W 88/02
See application file for complete search history.

(56) References Cited

U.S. PATENT DOCUMENTS

2007/0130312 A1 6/2007 Shin et al.
2007/0153676 A1* 7/2007 Baglin .................. H04W 24/04
370/216
(Continued)

FOREIGN PATENT DOCUMENTS

KR 10-2007-0050670 5/2007
KR 10-2010-0060728 6/2010
(Continued)

OTHER PUBLICATIONS

International Search Report dated Dec. 31, 2013 in connection with International Patent Application No. PCT/KR2013/008359, 3 pages.
(Continued)

*Primary Examiner* — Brian D Nguyen

(57) ABSTRACT

The present invention relates to a method for controlling a session keep-alive by a user equipment in a mobile communication system, comprising the steps of: setting request information of a session lifetime for a new application and transmitting the set request information to a network if the new application starts; and acquiring the session lifetime from the network and adjusting a message transmission period of the user equipment to keep-alive the session by using the session lifetime.

18 Claims, 10 Drawing Sheets

(51) Int. Cl.
*H04W 80/10* (2009.01)
*H04L 29/08* (2006.01)

(56) References Cited

U.S. PATENT DOCUMENTS

| | | | | |
|---|---|---|---|---|
| 2007/0153720 | A1* | 7/2007 | Baglin | H04W 24/06 370/328 |
| 2007/0153750 | A1* | 7/2007 | Baglin | H04W 76/028 370/338 |
| 2007/0183357 | A1* | 8/2007 | Bender | H04W 8/005 370/328 |
| 2007/0248085 | A1* | 10/2007 | Volpano | H04L 12/4679 370/389 |
| 2009/0156216 | A1 | 6/2009 | Liu et al. | |
| 2010/0223661 | A1* | 9/2010 | Yang | H04L 69/168 726/4 |
| 2011/0246595 | A1 | 10/2011 | Undery et al. | |
| 2012/0131639 | A1* | 5/2012 | Alex | H04L 63/0892 726/3 |
| 2013/0198171 | A1* | 8/2013 | Shah | G06F 17/30292 707/722 |

FOREIGN PATENT DOCUMENTS

| | | |
|---|---|---|
| KR | 10-2010-0119415 | 11/2010 |
| KR | 10-2012-0008264 | 1/2012 |

OTHER PUBLICATIONS

Written Opinion of International Searching Authority dated Dec. 31, 2013 in connection with International Patent Application No. PCT/KR2013/008359, 6 pages.

* cited by examiner

METHOD AND DEVICE FOR CONTROLLING SESSION KEEP-ALIVE FOR APPLICATION IN MOBILE COMMUNICATION SYSTEM

TECHNICAL FIELD

The present disclosure relates to a method and apparatus for controlling session keep-alive for an application in a mobile communication system.

BACKGROUND ART

The recent emergence of smartphones has led to a sharp increase in Transport Control Protocol (TCP)-based packet exchanges between User Equipments (UEs) and the Internet/network. The TCP is generally used to transmit traffic requiring reliability or to transmit traffic requiring flow control over the Internet. The TCP operates based on an end-to-end session and a TCP session is generated by end-to-end handshaking. If an on-going TCP session is not used for a predetermined time, the TCP session is released. There are various types of TCP-based service applications. Among the TCP-based service applications, for example, a messenger and chatting service such as Kakao Talk™ or Google Talk™ often transmits a keep-alive message to a server even in the absence of valid transmission data in order to prevent release of a TCP session.

For periodic transmission of a keep-alive message, a UE switches from idle mode to connected mode in spite of the absence of valid data. The state switching operation imposes a signaling/processing load on the network and the periodic transmission of a keep-alive message consumes battery power of the UE. Accordingly, there is a need for a method for effectively keeping a TCP session alive.

DISCLOSURE

Technical Problem

The present disclosure provides a method and apparatus for controlling session keep-alive for an application in a mobile communication system.

The present disclosure provides a method and apparatus for acquiring or resetting a preset session lifetime for a current established session and adjusting a transmission period of a message for keeping the session alive based on the acquired or reset session lifetime by a User Equipment (UE).

Technical Solution

In an aspect of the present disclosure, a method for controlling session keep-alive by a User Equipment (UE) in a mobile communication system includes, upon starting of a new application, setting request information about a session lifetime for the new application, and transmitting the request information to a network, and acquiring the session lifetime from the network and adjusting a transmission period of a message transmitted from the UE to keep a session alive, using the session lifetime.

In another aspect of the present disclosure, a UE for controlling session keep-alive in a mobile communication system includes a setter configured, upon starting of a new application, to set request information about a session lifetime for the new application, a transceiver configured to transmit the request information to a network and to acquire the session lifetime from the network, and a transmission period controller configured to adjust a transmission period of a message transmitted from the UE to keep a session alive, using the session lifetime.

In another aspect of the present disclosure, a method for controlling session keep-alive of a UE in a mobile communication system includes receiving request information about a session lifetime for a new application from the UE that has started the new application, and resetting the session lifetime based on the request information and transmitting information about the reset session lifetime to the UE.

In another aspect of the present disclosure, an apparatus for controlling session keep-alive of a UE in a mobile communication system includes a controller configured, upon receipt of request information about a session lifetime for a new application from the UE that has started the new application through a transceiver, to reset the session lifetime based on the request information and to control the transceiver to transmit information about the reset session lifetime to the UE.

Advantageous Effects

According to the present disclosure, since a UE acquires a preset session lifetime for a session established for an on-going application or resets the preset session lifetime to a requested lifetime, and adjusts a transmission period of a message transmitted to keep the session alive based on the acquired or reset session lifetime, the resulting decrease in unnecessary message transmissions and related state switching operations leads to reduction of the signaling and processing load of a network and the battery consumption of the UE.

BEST MODE FOR CARRYING OUT THE INVENTION

Figure 1:
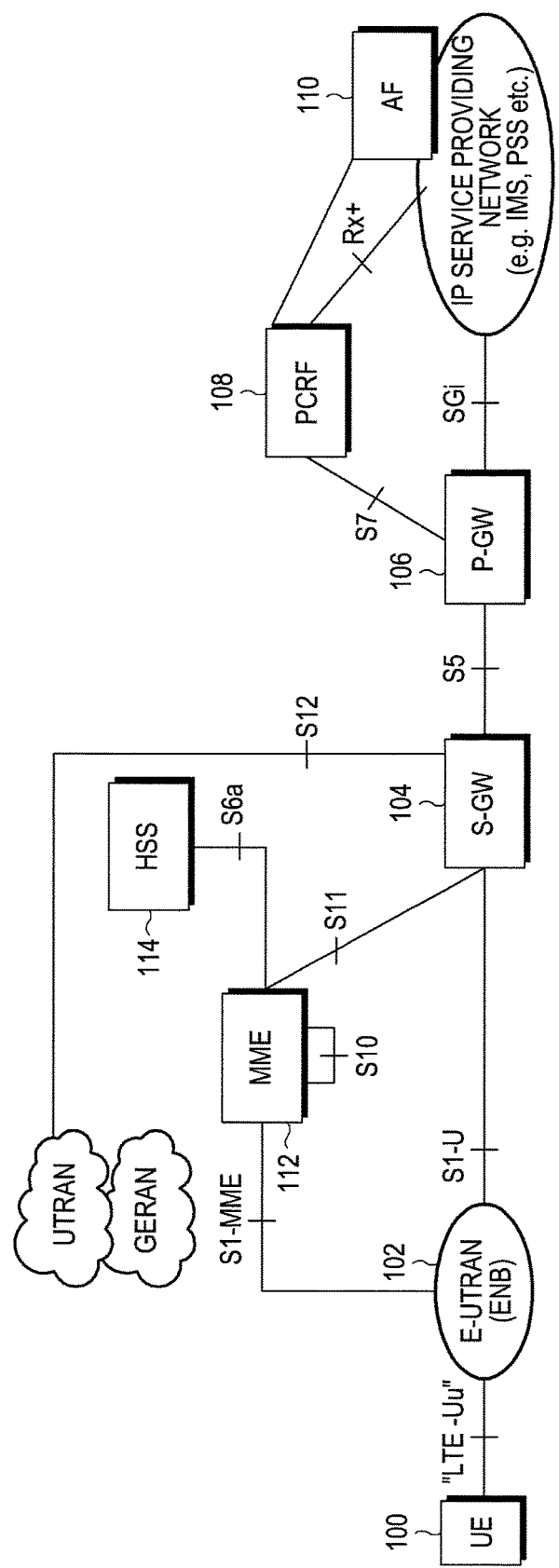
FIG. 1 illustrates an exemplary configuration of a general mobile communication system.

Reference will be made to preferred embodiments of the present disclosure with reference to the attached drawings. Like reference numerals denote the same components, although they are shown in different drawings. A detailed description of a generally known function and structure of the present disclosure will be avoided lest it should obscure the subject matter of the present disclosure. In addition, although the terms used in the present disclosure are defined in consideration of functions of the present disclosure, the terms may be changed according to the intention of a user or an operator, or customs. Therefore, the present disclosure must be understood, not simply by the actual terms used but by the meaning of each term lying within.

FIG. 1 illustrates an exemplary configuration of a general mobile communication system. A Long Term Evolution (LTE) system will be described below as an example of the mobile communication system.

Referring to FIG. 1, a Radio Access Network (RAN) of the LTE mobile communication system includes an Evolved Node B (ENB) 102 forming an Evolved Universal Terrestrial Radio Access Network (EUTRAN), a Mobility Management Entity (MME) 112, and a Serving GateWay (SGW) 104. A User Equipment (UE) 100 is connected to an external network through the ENB 102, the SGW 104, and a Packet Data Network GateWay (PGW) 106. An Application Function (AF) 110 is a device that exchanges specific application level-related information with the UE 100. A Policy Charging and Rules Function (PCRF) 108, which controls a policy related to Quality of Service (QoS) of users, is an entity that overall controls the QoS and charging of traffic A Policy and Charging Control (PCC) rule corresponding to the policy is transmitted to the PGW 106, for application.

The ENB 102 is a RAN node corresponding to, for example, a Radio Network Controller (RNC) in a UTRAN system and a Base Station Controller (BSC) in a GSM EDGE RAN (GERAN) system. The ENB 102 is connected to the UE 100 via a radio channel and functions similarly to a conventional RNC and BSC. The ENB 102 may manage a plurality of cells simultaneously. In the LTE mobile communication system, all user traffic transmitted by the Internet Protocol (IP) including a real-time service such as Voice over IP (VoIP) is serviced on a shared channel. For this purpose, the ENB 102 schedules UEs by collecting state information about the UEs.

The SGW 104 provides data bearers. The SGW 104 generates or removes a data bearer under the control of the MME 112. The MME 112 performs various control functions. One MME 112 may be connected to a plurality of ENBs.

In the LTE mobile communication system illustrated in FIG. 1, QoS is applied on an Evolved Packet System (EPS) bearer basis. One EPS bearer is used to transmit IP flows having the same QoS requirement. QoS-related parameters may be set for the EPS bearer and may include a QoS Class Identifier (QCI) and an Allocation and Retention Priority (ARP). An EPS bearer corresponds to, for example, a Packet Data Protocol (PDP) context in a General Packet Radio Service (GPRS) system. One EPS bearer belongs to a Packet Data Network (PDN) connection and the PDN connection may have an Access Point Name (APN) as an attribute. A RAN node manages EPS bearers by mapping the EPS bearers to logical channels.

Figure 2:
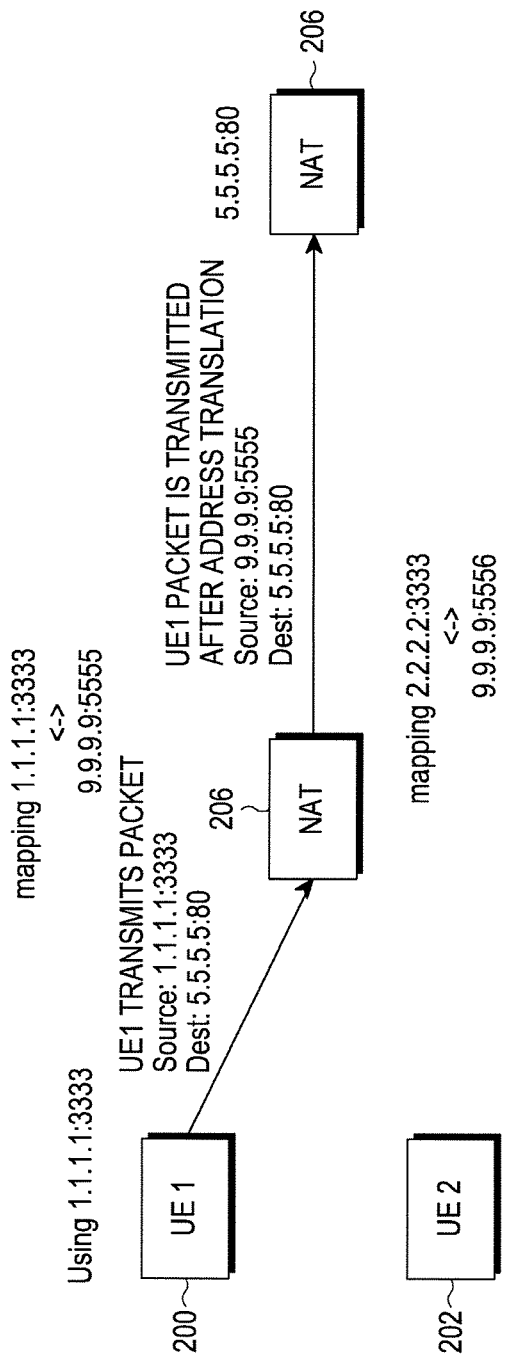
FIG. 2 is a view referred to for describing an exemplary method for controlling a Transport Control Protocol (TCP) session in the general mobile communication system.

FIG. 2 is a view referred to for describing an exemplary method for controlling a Transport Control Protocol (TCP) session in the general mobile communication system.

Referring to FIG. 2, a Network Access Translator (NAT) 204 is generally used not to expose a public IP address assigned to a user of a UE in order to ensure security or used to service a plurality of users based on limited private IP addresses that can be assigned by a private network. While not shown in FIG. 2, the NAT 204 is deployed around a PGW to achieve this object. When the NAT 204 is used to service a plurality of users based on limited public IP addresses, the NAT 204 is called a Network Address and Port Translation (NAPT). The NAT 204 enables use of one public IP address as up to 65535 private IP addresses. The NAT 204 has a table in which private IP addresses and ports are mapped to limited public IP addresses and ports assigned to UEs. The NAT 204 identifies a public IP address and port of a UE and transmits a private IP address and port mapped to the public IP address and port to the outside of a private network.

Specifically, if a 'public IP address:port' assigned to UE1 200 is for example '1.1.1.1:3333' and a 'public IP address: port' assigned to UE2 202 is for example '2.2.2.2:3333', the NAT 204 detects a 'private IP address: port' mapped to the public IP address: port' assigned to each of UE1 200 and UE2 202. Then, the NAT 204 resets 'IP address:port' of UE1 200 and UE2 202 to 'private IP address:extention port' mapped to the 'public IP address:port' assigned to UE1 200 and UE2 202, that is, 9.9.9.9:5555 and 9.9.9.9:5556 and transmits 9.9.9.9:5555 and 9.9.9.9:5556 to a server 206. The above operation for mapping the public IP address and port of a UE to a private IP address and extension port by the NAT will be referred to as 'port mapping' herein.

The NAT 204 maintains mapping between an IP address and port and an extension address and port for a UE for a predetermined time. If a user generates a TCP session to use a TCP-based service application through the user's UE, the NAT 204 releases the mapping of an IP address and port assigned to the UE for the TCP session, in the absence of packet transmission and reception for the TCP session for a predetermined time. Thus, the TCP session may not be kept alive any longer. Accordingly, the UE periodically transmits a keep-alive message to a server in order to keep the TCP session alive, in spite of no packet transmission and reception for the TCP session.

In the afore-described LTE communication system, if a UE does not perform data transmission and reception, the UE generally releases a connection to a RAN node and switches to idle mode. However, upon generation of a keep-alive message, the UE should switch from the idle mode to connected mode to transmit the keep-alive message. During these operations, huge signaling is generated between the UE and the RAN node and between the RAN node and a core network node.

In this context, the present disclosure provides a method for acquiring a time during which a NAT maintains port mapping (referred to as a 'session lifetime') or resetting the session lifetime to a required value and adjusting a transmission period of a keep-alive message based on the session lifetime by a UE. While embodiments of the present disclosure will be described basically in the context of a $3^{rd}$ Generation Partnership Project (3GPP) LTE system, those skilled in the art will understand that slight modifications can be made to the subject matter of the embodiments of the present disclosure for application to other communication/computer systems having similar technical backgrounds and system configurations within the scope of the present disclosure. Further, while the embodiments of the present disclosure are described with the appreciation that a TCP session is used, for the clarity of description, the subject matter of the present disclosure is also applicable to the User Datagram Protocol (UDP), for example, in order to prevent loss or retransmission of a UDP packet caused by deletion of address/port mapping of an NAT.

Figure 3:
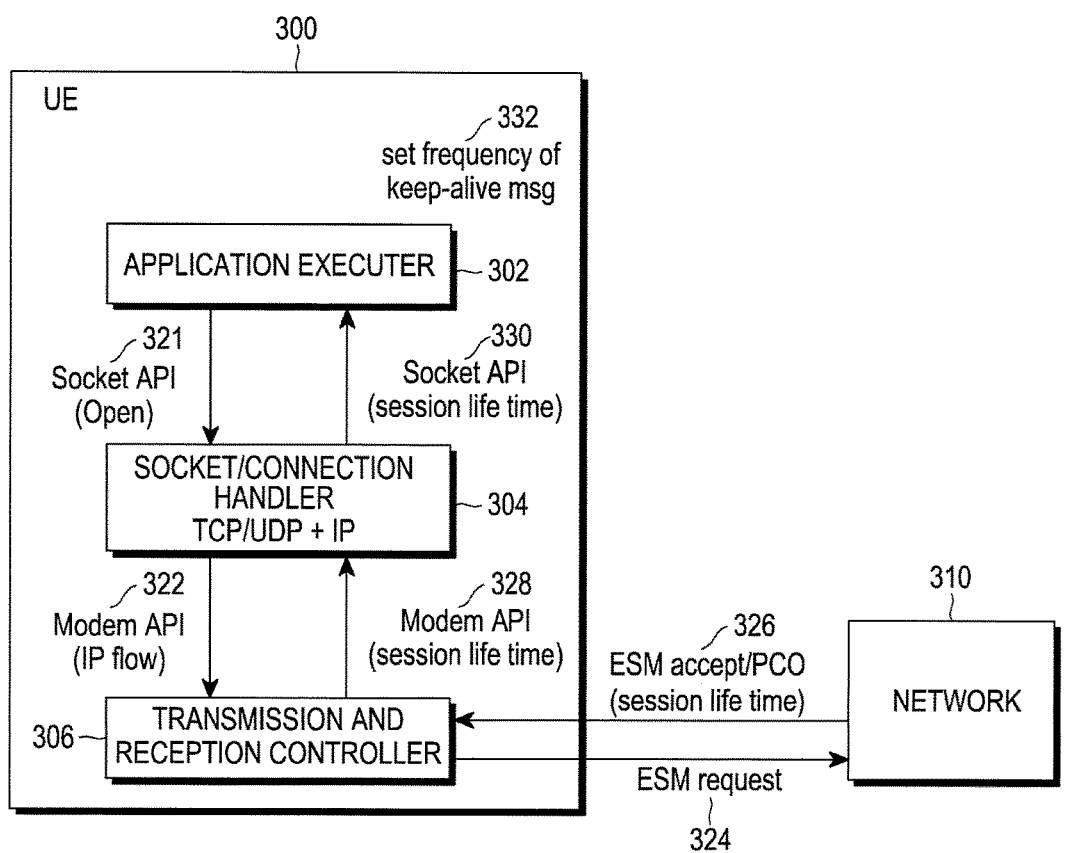
FIG. 3 illustrates an exemplary configuration of a mobile communication system according to an embodiment of the present disclosure.

FIG. 3 illustrates an exemplary configuration of a mobile communication system according to an embodiment of the present disclosure.

Referring to FIG. 3, for the convenience of description, the mobile communication system is shown as including only a UE 300 and a network 310. While not shown, it is assumed that the network 310 includes a server that provides an IP service, such as a EUTRAN, a core network, and a virtual private network, after the UE 300 described with reference to FIG. 1.

According to an embodiment of the present disclosure, the UE 300 includes an application executer 302, a socket/connection handler 304, and a transmission and reception controller 306. The application executer 302 executes a specific application according to a user's request and the socket/connection handler 304 manages the TCP/IP or the UDP/IP. The transmission and reception controller 306 provides an Application Programming Interface (API). In the above configuration of the UE 300, particularly components that perform important operations according to embodiments of the present disclosure have been described.

For example, it is assumed that a new service application is executed in the application executer 302. In this case, the application executer 320 requests the socket/connection handler 304 to open a new socket for the service application in operation 321. Then the socket/connection handler 304 generates a new socket according to the request and notifies the transmission and reception controller 306 that an IP flow for the service application will be transmitted using the API provided by the transmission and reception controller 306 in operation 322. The notification operation may be performed just by installing a packet filter representing a corresponding IP flow. Or the operation of operation 322 may be replaced with an operation for transmitting a new packet through the generated new socket by the service application. Then, the transmission and reception controller 306 transmits a session lifetime request of a NAT or an intended session lifetime value in an EPS Session Management (ESM) request message based on the notified information, that is, transmission of a packet filter or a new packet in operation 324. The EMS request message is a message requesting a PDN connection or EPS bearer resources. The EMS request message includes, for example, a PDN connectivity request message, a bearer resource modification/allocation request message, or the like. If the UE 300 performs an initial attachment procedure, the session lifetime may be included in an ESM request message inserted into an attach request message.

In operation 326, the network 310 transmits a current session lifetime of the NAT or a notification of resetting to the session lifetime value requested by the UE to the transmission and reception controller 306 by an ESM accept message in response to the resource request. The ESM accept message is configured according to a Protocol Configuration Option (PCO) in which a session lifetime defined according to an embodiment of the present disclosure is inserted. The session lifetime is set uniquely by an operator or acquired from the NAT in methods according to embodiments of the present disclosure. The transmission and reception controller 306 transmits the session lifetime to the socket/connection handler 304 in operation 328. In operation 330, the socket/connection handler 304 transmits the session lifetime to the application executer 302. Then the application executer 302 adjusts the transmission period of a keep-alive message based on the session lifetime. Hereinbelow, adjustment of the transmission period of a keep-alive message based on the session lifetime implies, for example, setting of the transmission period of the keep-alive message to a time shorter than the session lifetime of the NAT.

Now a description will be given of specific procedures for acquiring a current session lifetime of an NAT or requesting resetting of the session lifetime to a specific value by a UE according to embodiments of the present disclosure.

According to a first embodiment of the present disclosure, a UE requests a current session lifetime of an NAT. The UE may set a requested session lifetime value and transmit it so as to reset the current session lifetime of the NAT. Or an operator may reset the current session lifetime to a session lifetime set in a PGW. The UE may acquire the current session lifetime of the NAT and may adjust the transmission period of a keep-alive message of an on-going application using the acquired session lifetime.

Figure 4:
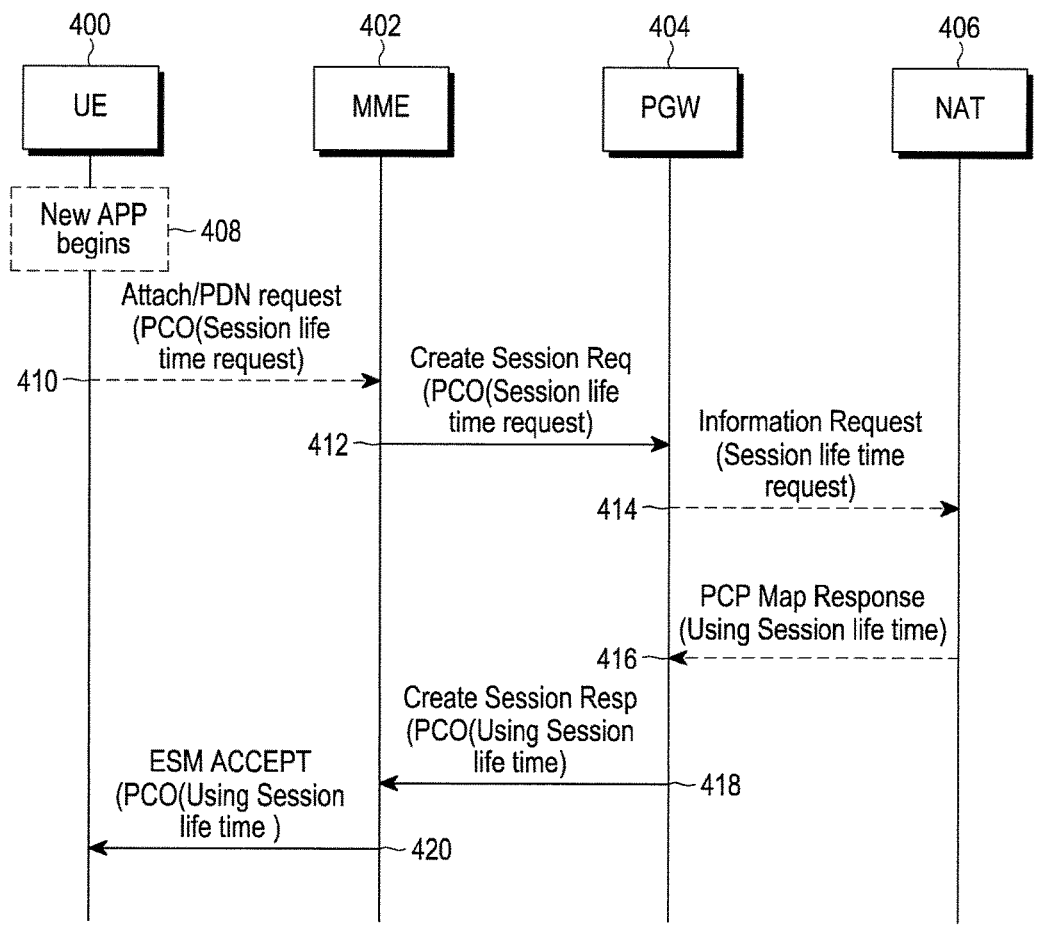
FIG. 4 is a diagram illustrating a signal flow for an exemplary operation for acquiring a session lifetime by a User Equipment (UE) according to a first embodiment of the present disclosure.

FIG. 4 is a diagram illustrating a signal flow for an exemplary operation for acquiring a session lifetime by a UE according to the first embodiment of the present disclosure.

Referring to FIG. 4, a UE 400 starts a new application in operation 408 and transmits a session lifetime request to an MME 402 in operation 410. The session lifetime request is transmitted to the MME 402, for example, using a PCO of a PDN connectivity request message or a bearer resource modification/allocation request message. In another example, if the UE 400 is performing an initial attachment procedure, the UE 400 transmits the session lifetime request in an ESM request message inserted in an attach request message to the MME 402. The session lifetime request may be included as one of parameters included in an additional parameter list in the PCO. A container identifier of the parameter may be set to Port Control Request (PCR) or Session Lifetime Request (STP). In the presence of a session lifetime requested by the UE 400, a container identifier contents field may be set to the session lifetime value. In the absence of a session lifetime requested by the UE 400, the container identifier contents field is set to 'empty'.

In operation 412, the MME 402 transmits the session lifetime request of the UE 400 to a PGW 404. The session lifetime request is transmitted to the PGW 404, for example, through a PCO included in a Create session request message. Subsequently, the PGW 404 transmits the session lifetime request to the NAT 406 according to the contents of the PCO or transmits the session lifetime value requested by the UE 400 to the NAT 406. For example, if the operator has a session lifetime set in the PGW 404 or receives a session lifetime value requested by the UE 400, the PGW 404 transmits the operator-set session lifetime value or the UE-requested session lifetime value to the NAT 406 by an information request in operation 414. In this case, the NAT 406 resets the current session lifetime to the operator-set session lifetime value or the session lifetime value requested by the UE 400 and indicates completion of the reset to the PGW 404, for example, by a PCP MAP response in operation 416. Or the NAT 406 may consider its preset session lifetime value with priority. Then, the NAT 406 transmits its preset session lifetime value to the PGW 404 along with the indication.

In another example, if there is no operator-set session lifetime value and the PGW 400 does not acquire the session lifetime value requested by the UE 400, the PGW 400 requests the current session lifetime of the NAT 406 to the NAT 406 in operation 414. In operation 416, the NAT 406 transmits its current session lifetime value to the PGW 404, for example, by a PCP MAP response. Consequently, the session lifetime value transmitted by the NAT 406 in operation 416 is the 'current session lifetime' of the NAT 406.

In operation 418, the PGW 404 transmits the current session lifetime value of the NAT 406 to the MME 402. The current session lifetime value indicates a session lifetime reset or currently used by the NAT 406 and is transmitted to the MME 402, for example, through a PCO of a Create session response message or a Create/Update Bearer Request message. The session lifetime is included as one of parameters included in an additional parameter list in the PCO, as in the Create session message. A container identifier of the parameter may be set to PCP or STP. A container identifier contents field is set to the current session lifetime value.

In operation 420, the MME 402 transmits the acquired current session lifetime value to the UE 400. The current session lifetime value may be transmitted using a PCO of an ESM ACCEPT message such as a Session Management Request message or a PDN connectivity Accept message.

Then, upon receipt of the current session lifetime used by the NAT 406, the UE 400 adjusts the transmission period of a keep-alive message for the new application being executed, using the received session lifetime in operation 408.

According to a second embodiment of the present disclosure, a UE transmits its intended specific session lifetime value to a NAT through an MME. The specific session lifetime value is compared with a session lifetime value subscribed by the UE in subscriber information about the UE, stored in a Home Subscriber Server (HSS) and the smaller value between the specific session lifetime value and the subscribed session lifetime value is transmitted to the NAT. In the absence of any session lifetime value subscribed by the UE in the subscriber information about the UE, the HSS determines a subscribed session lifetime value corresponding to the subscriber information about the UE and transmits the determined session lifetime value to the NAT. Then the NAT resets its session lifetime to the determined session lifetime value and the UE acquires the reset session lifetime value. Thus, the UE may adjust the transmission period of a keep-alive message of an on-going application using the reset session lifetime value.

Figure 5:
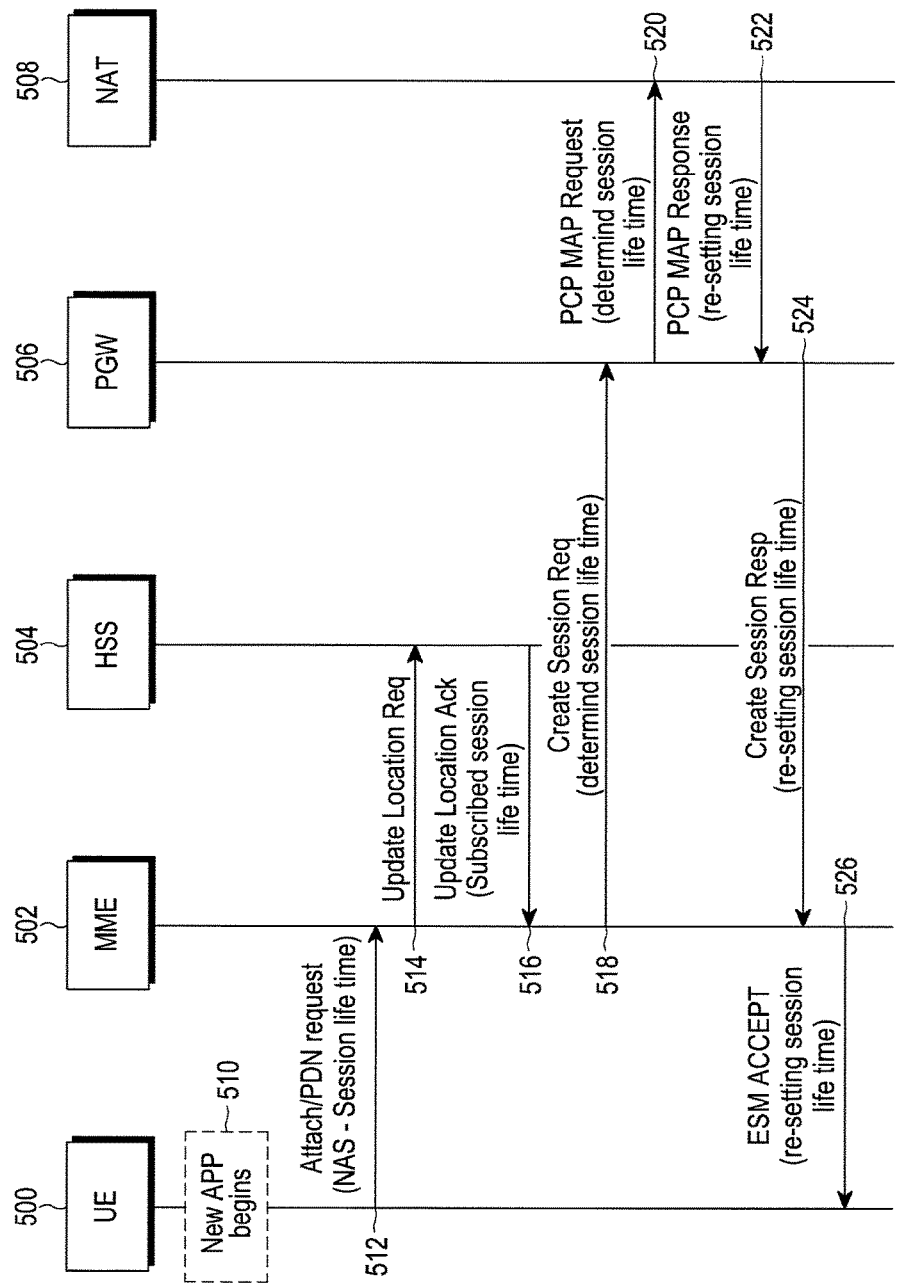
FIG. 5 is a diagram illustrating a signal flow for an exemplary operation for exchanging session lifetimes with a network by a UE according to a second embodiment of the present disclosure.

FIG. 5 is a diagram illustrating a signal flow for an exemplary operation for exchanging session lifetimes with a network by a UE according to the second embodiment of the present disclosure.

Referring to FIG. 5, a UE starts a new application in operation 510 and transmits a specific session lifetime value to an MME 502 in order to reset a session lifetime of a NAT 508 in operation 512. The specific session lifetime value may be included in, for example, a session lifetime field of a PDN connectivity request message or a bearer resource modification/allocation request message. In another example, if the UE 500 is performing an initial attachment procedure, the UE 500 transmits the specific session lifetime in an ESM request message inserted into an attach request message to the MME 502.

In operation 514, the MME 502 transmits an Update Location Request message or a message requesting subscriber information about the UE 500 to a HSS 504. The HSS 504 detects a pre-stored session lifetime to which the UE 500 has subscribed and transmits the subscribed session lifetime in subscription information about the UE 500 to the MME 502 in operation 516. The subscription information may be transmitted to the MME 502, for example, in an Update Location ACK being a response message to the Update Location Request message or in a subscriber information message. The subscribed session lifetime may be set differently according to the subscriber information about the UE, that is, a charging policy or a data service amount to which the UE has subscribed.

In operation 518, the MME 502 compares the specific session lifetime acquired from the UE 500 with the subscribed session lifetime acquired from the HSS 504 and determines the smaller value to be a session lifetime to be applied to the UE 500. Then the MME 502 transmits the determined session lifetime to a PGW 506. The determined session lifetime is transmitted to the PGW 506, for example, in a GPRS Tunneling Protocol (GTP) message, that is, a Create Session Request message or a bearer resource command message.

The PGW 506 transmits the determined session lifetime to the NAT 508 in operation 520. The determined session lifetime is transmitted to the NAT 508, for example, in a PCP MAP request message. In operation 522, the NAT 508 resets its current session lifetime to the determined session lifetime and transmits the reset session lifetime value to the PGW 506. The reset session lifetime value is transmitted to the PGW 506, for example, in a PCP MAP response message in response to the PCP MAP request message.

In operation 524, the PGW 506 transmits the reset session lifetime value to the MME 502. The reset session lifetime value is transmitted to the MME 502, for example, in a Create Session Response message or a Create/Update Bearer Request message. Then the MME 502 transmits the reset session lifetime value to the UE 500 in operation 526. Herein, the reset session lifetime value is inserted in a session lifetime field of an EMS ACCEPT message such as a Session Management Request message or a PDN connectivity Accept message. Or the PGW 504 may transmit the determined session lifetime received from the NAT 506 to the UE 500 using a PCO, as in the foregoing embodiment.

Subsequently, the UE 500 adjusts the transmission period of a keep-alive message of the new application started in operation 510 using the reset session lifetime value.

According to a third embodiment of the present disclosure, when a PCRF generates PCC for an application, the PCRF determines a session lifetime suitable for the application and transmits the determined session lifetime to a NAT. Accordingly, the NAT resets a current session lifetime to the session lifetime determined by the PCRF and transmits the reset session lifetime to a UE through a PGW and an MME. Then the UE may adjust the transmission period of a keep-alive message of the application based on the reset session lifetime.

Figure 6:
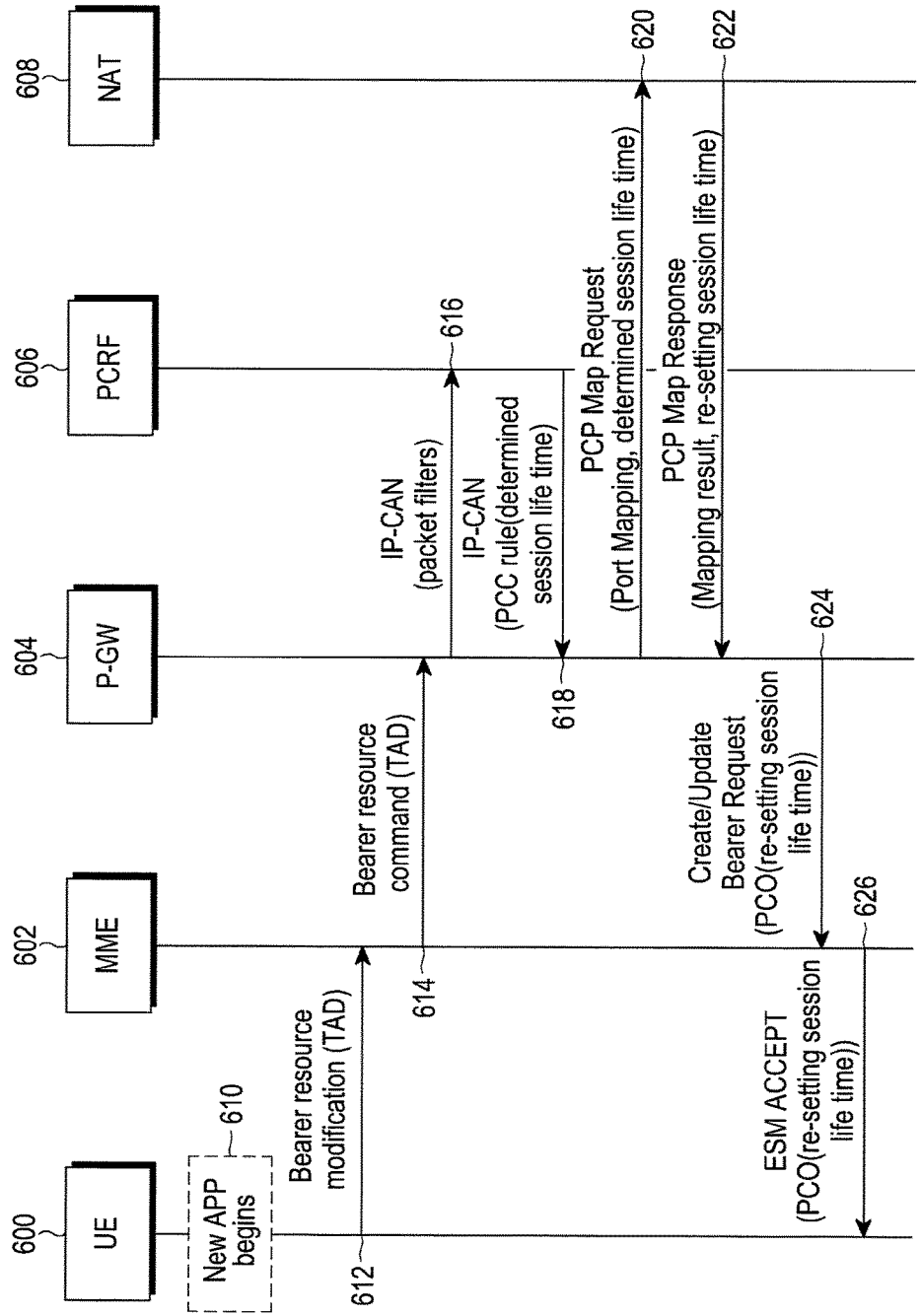
FIG. 6 is a diagram illustrating a signal flow for an exemplary operation for determining and applying a session lifetime based on dynamic Policy Control and Charging (PCC), that is, under the control of a Policy Charging and Rules Function (PCRF) according to a third embodiment of the present disclosure.

FIG. 6 is a diagram illustrating a signal flow for an exemplary operation for determining and applying a session lifetime based on dynamic PCC, that is, under the control of a PCRF according to a third embodiment of the present disclosure.

Referring to FIG. 6, a UE 600 starts a new application in operation 610. In operation 612, the UE 600 transmits, for example, a bearer resource modification/allocation request message in which a Traffic Aggregate Description (TAD) including packet filters for the new application is inserted to an MME 602. The MME 602 transmits a Bearer Resource Command message with the TAD inserted in it to a PGW 604 in operation 614. The PGW 604 transmits the packet filters included in the TAD to a PCRF 606 in operation 616. The packet filters are transmitted to the PCRF 606, for example, in an IP Connectivity Access Network (IPCAN) message requesting a PCC rule. Then the PCRF 606 determines a session lifetime during generating PCC for each application and determines a session lifetime suitable for the new application started in operation 610 during generating a PCC for the new application, in operation 618.

Then the PCRF 606 transmits the PCC rule including the determined session lifetime to the PGW 604, for example, in an IPCAN message. According to another embodiment, the PCRF 606 may transmit the determined session lifetime to the PGW 604 by signaling through a Gx interface, instead of using the PCC rule.

In operation 620, the PGW 604 transmits a port mapping request and the determined session lifetime for the application started in operation 610 to the NAT 608. The port mapping request and the determined session lifetime are transmitted to the NAT 608 in a PCP map request message. Then the NAT 608 sets the current session lifetime to the determined session lifetime and transmits a result of the port mapping along with the set session lifetime to the PGW 604 in operation 622.

In operation 624, the PGW 604 transmits the set session lifetime to the MME 602. Herein, the set session lifetime is transmitted to the MME 602, for example, using a PCO of a Create/Update Bearer Request message. The PCO may include the session lifetime request as one of parameters included in an additional parameter list. A container identifier of the parameter may be set to PCP and a container identifier contents field may be set to the set session lifetime. In operation 626, the MME 602 transmits the set session lifetime value to the UE 600. Herein, the current session lifetime value is transmitted by inserting a PCO, for example, in an ESM ACCEPT message such as a Session Management Request message or a PDN connectivity Accept message.

Subsequently, upon receipt of the session lifetime set by the NAT 608, the UE 600 may adjust the transmission period of a keep-alive message for the new application started in operation 610 using the set session lifetime.

According to a fourth embodiment of the present disclosure, a UE sets a PCO including an intended session lifetime for an application and transmits the PCO to a NAT. Accordingly, the NAT sets a current session lifetime to the session lifetime acquired from the PCO and transmits a PCO with the set session lifetime to the UE. Therefore, the UE may adjust the transmission period of a keep-alive message for the application based on the set session lifetime.

Figure 7:
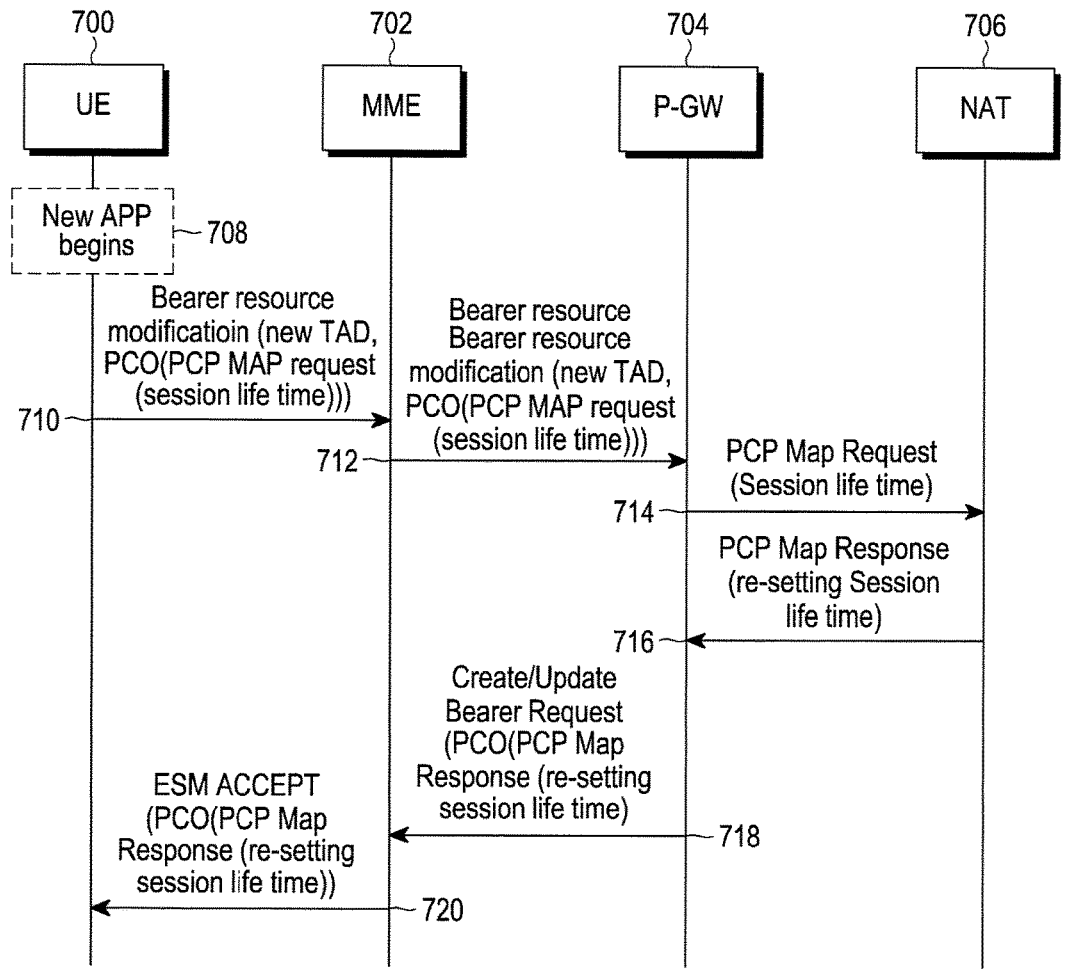
FIG. 7 is a diagram illustrating a signal flow for an exemplary operation for negotiating a session lifetime directly with a Network Address Translator (NAT) using a Protocol Configuration Option (PCO) by a UE according to an embodiment of the present disclosure.

FIG. 7 is a diagram illustrating a signal flow for an exemplary operation for negotiating a session lifetime directly with a NAT using a PCO by a UE according to an embodiment of the present disclosure.

Referring to FIG. 7, a UE 708 starts a new application in operation 708 and transmits a bearer resource modification/allocation message to an MME 702 in operation 710. The bearer resource modification/allocation request message includes a TAD including packet filters for the application and a container identifier set to PCP in an additional parameter list of a PCO. A container identifier contents field is configured to include a UE-intended session lifetime in a PCP MAP request message.

In operation 712, the MME 702 transmits the TAD and PCO of the ESM message acquired from the UE 700 to a PGW 704, for example, in a Bearer resource command message or a bearer resource modification message. Then the PGW 704 transmits the received PCP MAP request message to a NAT 706 in operation 714. In operation 716, the NAT 706 sets a current session lifetime to the session lifetime included in the PCP MAP request message. The PGW 704 may include the set session lifetime as one of parameters included in an additional parameter list of a PCO in operation 718. A container identifier of the parameter is set to PCP and, for example, a PCP MAP response received through the NAT 706 is inserted in a container identifier contents field. The PGW 704 transmits the set PCO to the MME 702, for example, in a Create Session Response message or a Create/Update Bearer Request message. In operation 720, the MME 702 transmits an EMS ACCEPT message including the PCO to the UE 700. The EMS ACCEPT message corresponds to a Session Management Request message or a PDN connectivity Accept message.

Subsequently, the PCP MAP Response message inserted in the PCO is transmitted to a PCP client. The PCP client may adjust the transmission period of a keep-alive message for the new application started in operation 708 using the session lifetime set by the NAT 706, inserted in the PCP MAP Response message.

According to a fifth embodiment of the present disclosure, information indicating whether a session lifetime setting function is supported or not is exchanged between a UE and a network and the transmission period of a keep-alive message for an application is adjusted according to the result of the exchange.

Figure 8:
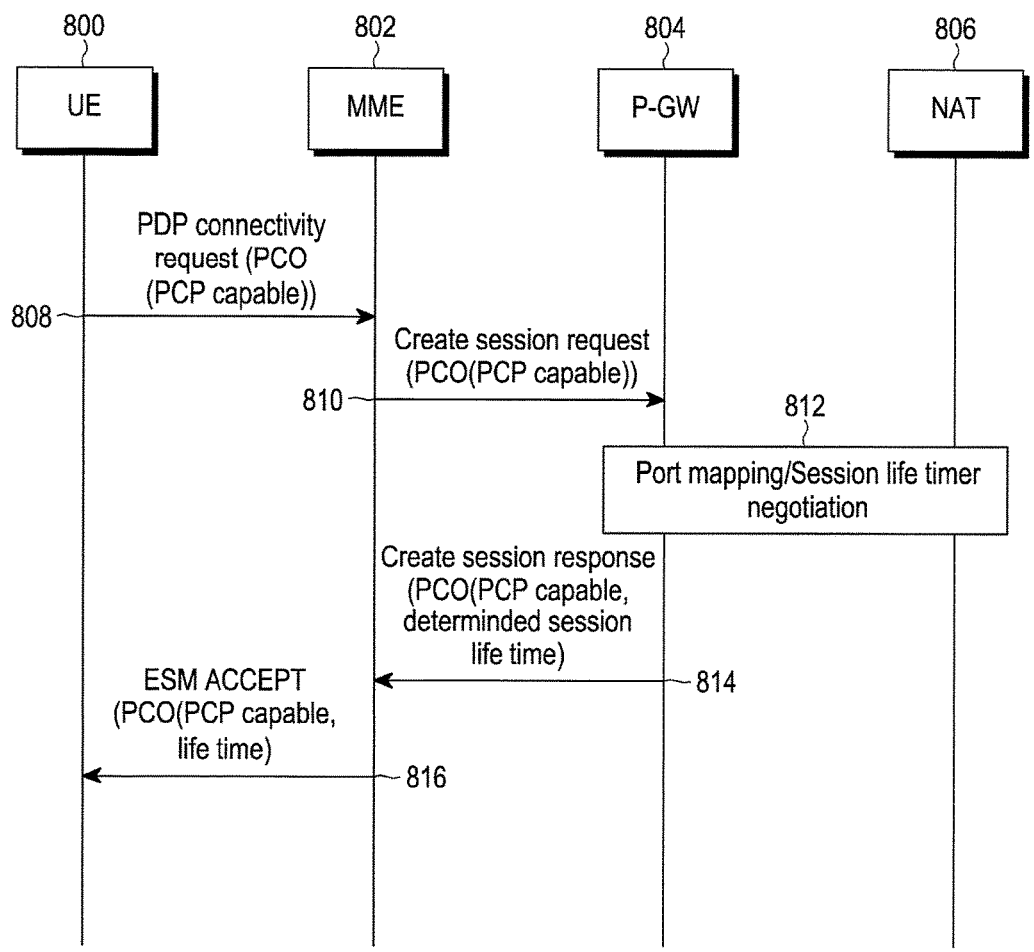
FIG. 8 is a diagram illustrating a signal flow for an exemplary operation for transmitting and receiving information indicating whether a session lifetime notification function is supported between a UE and a network according to a fifth embodiment of the present disclosure.

FIG. 8 is a diagram illustrating a signal flow for an exemplary operation for indicating whether a session lifetime notification function is supported between a UE and a network according to the fifth embodiment of the present disclosure.

Referring to FIG. 8, a UE 800 transmits information indicating that the UE 800 supports a function of setting a session lifetime of a NAT 806 (hereinbelow, referred to a 'PCP capable' function) to an MME 802 in operation 808. The information indicating support or non-support of the PCP capable function is transmitted using, for example, a PCO of a PDN connectivity request message or a bearer resource modification/allocation request message. In another example, if the UE 800 performs an initial attachment procedure, the information indicating support or non-support of the PCP capable function is transmitted to the MME 802 by an ESM message inserted into an attach request message. Capability information about the session lifetime may be included as one of parameters in an additional parameter list in the PCO. A container identifier of the parameter is set to PCP and a container identifier contents field may be set to 'empty' or a specific session lifetime value requested by the UE 800.

In operation 810, the MME 802 transmits the PCO acquired from the UE 800 to a PGW 804, for example, in a Create session request message.

Then the PGW 804 performs a port mapping request and session life time negotiation operation with the NAT 806 in operation 812. Specifically, the PGW 804 requests a current session lifetime to the NAT 806 and acquires it from the NAT 806. If the PGW 804 has a preset session lifetime or acquires a UE-requested session lifetime from the PCO, the PGW 804 compares the preset session lifetime, the UE-requested session lifetime, and the current session lifetime acquired from the NAT 806 and determines the smallest lifetime value as a session lifetime for the NAT 806. Then the PGW 804 transmits the determined session lifetime to the NAT 806. Upon receipt of the determined session lifetime, the NAT 806 sets the determined session lifetime as the current session lifetime and indicates completion of the setting to the PGW 804.

In operation 814, the PGW 804 transmits the determined session lifetime in a PCO to the MME 802. The determined session lifetime is transmitted along with information indicating whether the PGW 804 supports the PCP capable function to the MME 802, for example, in a Create session response message or a Create/Update Bearer Request message. The determined session lifetime may be included as one of parameters included in an additional parameter list in the PCO. A container identifier of the parameter may be set to PCP indicating support of the PCP capable function or Port Control Not Supported indicating non-support of the PCP capable function. A container identifier contents field is set to the determined session lifetime. In operation 816, the MME 802 transmits the PCO to the UE 800. The PCO is inserted in an ESM ACCEPT message such as a Session Management Request message or a PDN connectivity Accept message and transmitted to the UE 800.

Upon receipt of the PCO, the UE 800 may adjust the transmission period of a keep-alive message for the application using the session lifetime acquired from the PCO. Or the UE 800 determines whether the PGW 804 supports the PCP capable function from the PCO and determines the following operation according to the determination.

Figure 9:
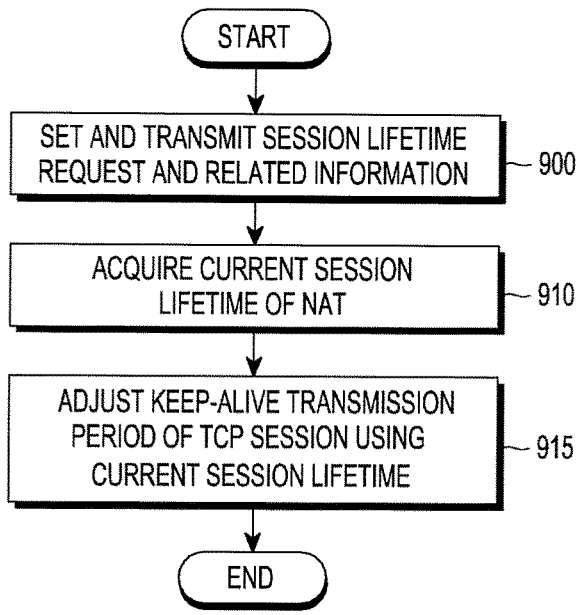
FIG. 9 is a flowchart illustrating an exemplary operation of a UE according to embodiments of the present disclosure.
Figure 10:
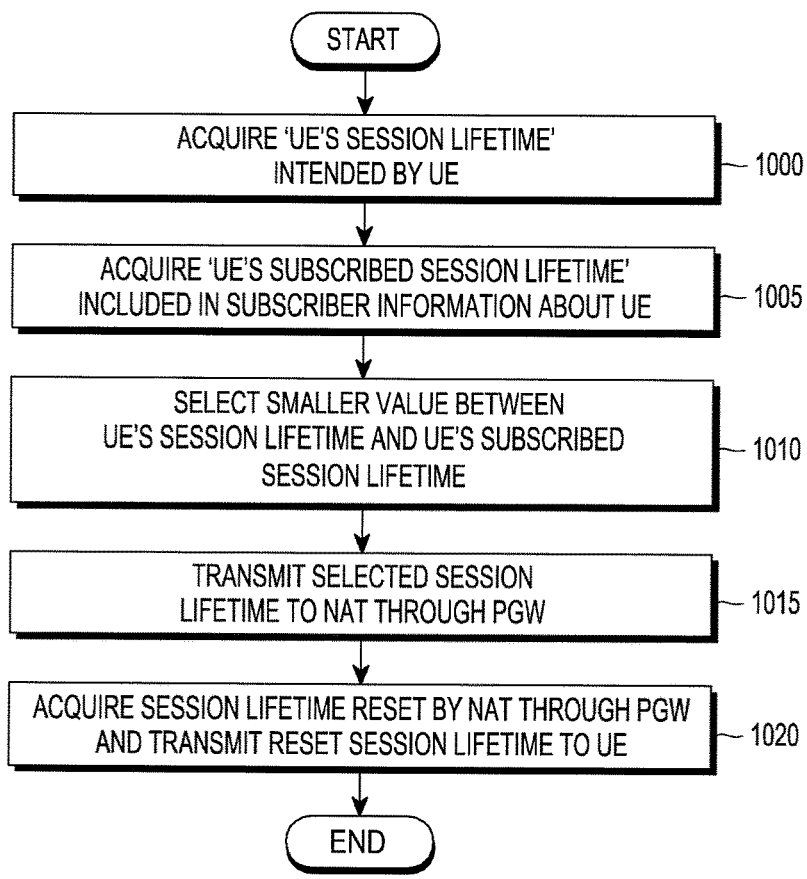
FIG. 10 is a flowchart illustrating an exemplary operation of a Mobility Management Entity (MME) according to a second embodiment of the present disclosure.
Figure 11:
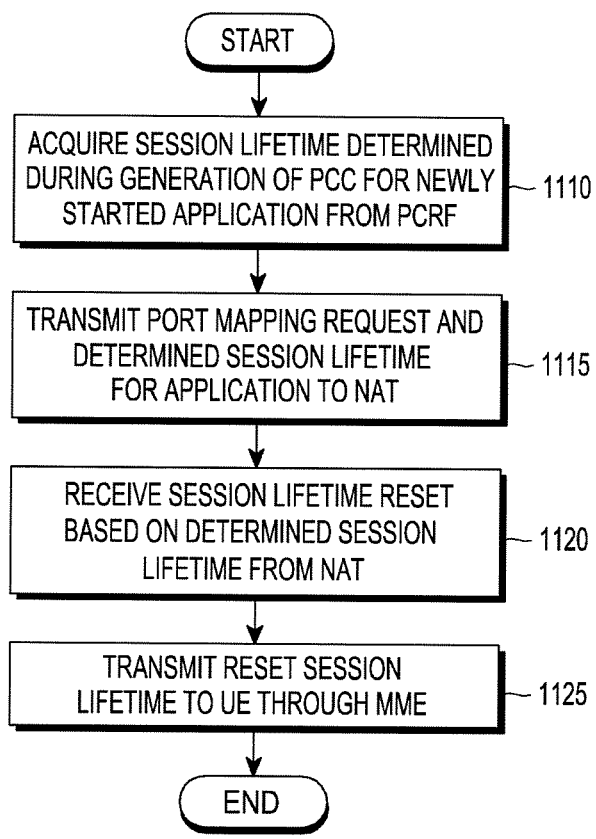
FIG. 11 is a flowchart illustrating an exemplary operation of a Packet Data Network GateWay (PGW) according to a third embodiment of the present disclosure.

With reference to FIGS. 9, 10, and 11, an operation of each apparatus that performs an important operation according to each embodiment of the present disclosure will be described below.

FIG. 9 is a flowchart illustrating an exemplary operation of a UE according to embodiments of the present disclosure.

Referring to FIG. 9, the UE sets a request for a current session lifetime of a NAT and related information and transmits them to a network in operation 900. According to the first and second embodiments of the present disclosure, the UE may set an intended session lifetime value as the related information and transmit it. How the session lifetime or the related information is transmitted has been described with reference to each embodiment and thus will not be described herein in detail. Particularly in the fourth embodiment of the present disclosure, the session lifetime or the related information is inserted in a message using a PCO. In the fifth embodiment of the present disclosure, the UE includes information indicating support or non-support of the PCP capable function, as the related information.

In operation 905, the UE acquires the current session lifetime of the NAT. The current session lifetime of the NAT is given as a different value according to each embodiment. For example, the current session lifetime of the NAT may be set to a UE-requested specific session lifetime value in the first embodiment of the present disclosure and to a session lifetime set in subscription information about the UE in the second embodiment of the present disclosure. In the third embodiment of the present disclosure, the current session lifetime of the NAT may be set to a session lifetime determined when PCC is generated for a new application that the UE has started.

In operation 910, the UE adjusts the transmission period of a keep-alive message in a TCP session using the current session lifetime value.

FIG. 10 is a flowchart illustrating an exemplary operation of an MME according to the second embodiment of the present disclosure.

Referring to FIG. 10, the MME acquires a 'UE's session lifetime' that a UE wants to set in operation 1000. The procedure for acquiring the UE's session lifetime has been described in detail with reference to FIG. 5 and thus will not be described herein in detail.

In operation 1005, the MME acquires a 'UE''s subscribed session lifetime' included in subscriber information about the UE. Then the MME selects the smaller value between the UE's session lifetime and the UE's subscribed session lifetime in operation 1010 and transmits the selected session lifetime to a NAT through a PGW in operation 1015. Then the MME acquires a session lifetime to which the NAT resets the current session lifetime using the selected session lifetime and transmits the acquired session lifetime to the UE in operation 1020.

FIG. 11 is a flowchart illustrating an exemplary operation of a PGW according to the third embodiment of the present disclosure.

Referring to FIG. 11, the PGW acquires a session lifetime determined during generation of PCC for a new application that a UE has started from a PCRF in operation 1110.

In operation 1115, the PGW transmits a port mapping request for the application along with the determined session lifetime to a NAT. The PGW receives a session lifetime reset based on the determined session lifetime from the NAT in operation 1120 and transmits the reset session lifetime through the MME in operation 1125.

Figure 12:
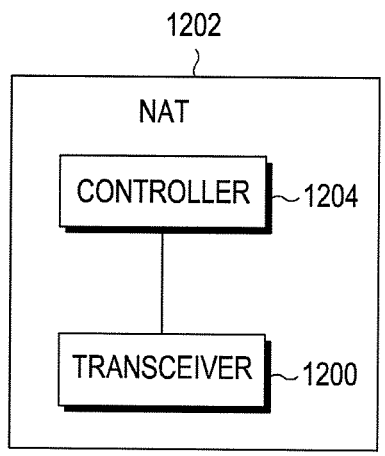
FIG. 12 is a block diagram illustrating an exemplary structure of a NAT according to an embodiment of the present disclosure.

FIG. 12 is a block diagram illustrating an exemplary structure of a NAT according to an embodiment of the present disclosure. Herein, the NAT is shown as including only units that perform operations according to embodiments of the present disclosure, for the convenience of description. However, some units of the NAT may be incorporated into a single unit or one unit of the NAT may be divided into sub-units.

Referring to FIG. 12, a NAT 1200 includes, for example, a controller 1202 and a transceiver 1204. When the transceiver 1204 senses reception of information requesting a session lifetime for a new application from a UE that has started the new application, the controller 1202 acquires a specific session lifetime intended by the UE and information indicating whether the UE supports the PCP capable function from the request information. The request information may be received using a PCO in a resource request to the network or a message transmitted during initial attachment.

Then the controller 1202 may reset the session lifetime to the smaller value between the UE-intended session lifetime value acquired from the request information and a subscribed session lifetime included in subscriber information about the UE. Further, the controller 1202 may reset the session lifetime based on a session lifetime determined when PCC is generated for the new application. The controller 1202 controls the transceiver 1204 to transmit information about the reset session lifetime to the UE.

According to the above embodiments of the present disclosure, a UE acquires a TCP session lifetime during a port mapping operation of a NAT and adjusts the transmission period of a keep-alive message for the application using the acquired session lifetime. Therefore, unnecessary transmissions of the keep-alive message and unnecessary UE state transitions can be reduced.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents.

The invention claimed is:

1. A method for maintaining a session at a user equipment (UE) in a mobile communication system, the method comprising:
upon starting of an application, transmitting, a session lifetime setting request for the application;
receiving a response comprising information related to a session lifetime in response to the session lifetime setting request from a network;
adjusting a transmission period of a message to maintain a session of the application with a server, using the session lifetime acquired from the information; and
transmitting, to the server, the message based on the adjusted transmission period.

2. The method according to claim 1, wherein the session lifetime setting request is transmitted to the network using a message transmitted to request resources to the network or a message transmitted during initial attachment to the network.

3. The method according to claim 1, wherein the session lifetime setting request includes at least one of a value of the session lifetime and information indicating whether the UE supports a session lifetime setting function.

4. The method according to claim 3, wherein the session lifetime acquired from the information is a smaller value between the value of the session lifetime and a subscribed session lifetime included in subscriber information about the UE.

5. The method according to claim 1, wherein the session lifetime acquired from the information is reset based on a session lifetime determined during generating a policy and charging rule for the application.

6. A user equipment (UE) for maintaining a session in a mobile communication system, the UE comprising:
upon starting of an application,
a transceiver configured to transmit a session lifetime setting request for the application, receive a response comprising information related to a session lifetime in response to the session lifetime setting request from a network; and
a controller configured to adjust a transmission period of a message to maintain a session of the application with a server, using the session lifetime acquired from the information; and
control the transceiver to transmit, to the server, the message based on the adjusted transmission period.

7. The UE according to claim 6, wherein the session lifetime setting request is transmitted to the network using a message transmitted to request resources to the network or a message transmitted during initial attachment to the network.

8. The UE according to claim 6, wherein the session lifetime setting request includes at least one of a value of the session lifetime and information indicating whether the UE supports a session lifetime setting function.

9. The UE according to claim 8, wherein the session lifetime acquired from the information is a smaller value between the value of the session lifetime and a subscribed session lifetime included in subscriber information about the UE.

10. The UE according to claim 6, wherein the session lifetime acquired from the network is reset based on a session lifetime determined during generating a policy and charging rule for the application.

11. A method for maintaining a session with a user equipment (UE) in a mobile communication system, the method comprising:
receiving, from the UE, a session lifetime setting request for an application;
determining a smaller value between a value of a session lifetime acquired from the session lifetime setting request and a subscribed session lifetime included in subscriber information about the UE; and
resetting the smaller value as a session lifetime to maintain a session of the application with the UE, and transmitting, to the UE, a response comprising the smaller value in response to the session lifetime setting request.

12. The method according to claim 11, wherein the session lifetime setting request is received to a network using a message transmitted to request resources to the network or a message transmitted during initial attachment to the network.

13. The method according to claim 11, wherein the session lifetime setting request includes at least one of a value of the session lifetime and information indicating whether the UE supports a session lifetime setting function.

14. The method according to claim 11, wherein the smaller value is used to adjust a transmission period of a message to maintain a session of the application with a server by the UE.

15. An apparatus for maintaining a session with a user equipment (UE) in a mobile communication system, the apparatus comprising:
a transceiver configured to receive, from the UE, a session lifetime setting request for an application; and
a controller configured to determine a smaller value between a value of a session lifetime acquired from the session lifetime setting request and a subscribed session lifetime included in subscriber information about the UE, reset the smaller value as a session lifetime to maintain a session of the application with the UE, and control the transceiver to transmit, to the UE, a response comprising the smaller value in response to the session lifetime setting request.

16. The apparatus according to claim 15, wherein the session lifetime setting request is received to a network using a message transmitted to request resources to the network or a message transmitted during initial attachment to the network.

17. The apparatus according to claim 15, wherein the session lifetime setting request includes at least one of a value of the session lifetime and information indicating whether the UE supports a session lifetime setting function.

18. The apparatus according to claim 15, wherein the smaller value is used to adjust a transmission period of a message to maintain a session of the application with a server by the UE.

* * * * *